United States Patent [19]
Odell

[11] Patent Number: 5,268,877
[45] Date of Patent: Dec. 7, 1993

[54] DIGITAL BEAMFORMING AND FILTERING CIRCUIT

[75] Inventor: Douglas L. Odell, Poulsbo, Wash.

[73] Assignee: The United States of America as represented by the Secretary of the Navy, Washington, D.C.

[21] Appl. No.: 880,824

[22] Filed: May 11, 1992

[51] Int. Cl.$^5$ ............................................. G01S 15/00
[52] U.S. Cl. .................................. 367/103; 367/105; 128/661.01
[58] Field of Search .................... 367/103, 105, 7, 11; 73/626; 128/661.01; 342/417, 378, 157, 195; 364/724.01, 724.1, 413.13

[56] References Cited

U.S. PATENT DOCUMENTS 4,207,620 6/1980 Morgera ............................. 367/103
5,014,712 5/1991 O'Donnell ........................... 367/103

Primary Examiner—Daniel T. Pihulic
Attorney, Agent, or Firm—Edward J. Connors, Jr.; W. C. Townsend

[57] ABSTRACT

A beamformer system is disclosed which includes an array of sensors such as hydrophones which produce signals from which information relating to a target is to be determined. The beamformer system includes a channel for each sensor, the channel including a varable length shift register which provides bulk delay to received signals, a FIR interpolation filter which provides vernier delay and shading. The system also includes a summation tree which adds the received signals and a sign extension/bit reversal filter to avoid authmetic overflow.

8 Claims, 4 Drawing Sheets

DIGITAL BEAMFORMING AND FILTERING CIRCUIT

STATEMENT OF GOVERNMENT INTEREST

The invention described herein may be manufactured and used by or for the Government of the United States of America for governmental purposes without the payment of any royalties thereon or therefor.

This invention relates to digital signal processing generally and, more specifically, to time domain beamforming of undersea acoustic signals. The system is also useful for inverse beamforming, finite impulse response (FIR) filtering, and infinite impulse response (IIR) filtering. The system is well adapted for implementation in VLSI chips in a low cost efficient manner. In addition, the system has potential applications in acoustic telemetry systems, acoustic noise measurement systems, and medical ultrasound systems.

A beamformer, sometimes referred to as a phased array receiver, can be thought of as a spatial filter which operates on the outputs of an array of sensors such as hydrophones in order to enhance the amplitude of a signal (with wavefronts propagating through a medium such as the ocean) relative to ambient noise and directional interference sources. Conventional time-domain beamforming is accomplished by summing the appropriately delayed and shaded (weighted) signals from an array of sensors. The receiving beam pattern can be redirected (steered) and reshaped by electronically adjusting the delays and shading factors. In digital systems, shading is implemented with multipliers, and bulk (coarse) delays are implemented with shift registers or random access memory (RAM) buffers. A major difficulty arises because the resolution of the delay is limited by the (signal) sampling rate and is usually not fine enough for beamforming. Accurate interpolation techniques are needed to achieve vernier delays required for high performance and flexibility. These techniques are computationally intensive and account for most of the computational requirements in a beamformer system. An alternative to interpolation is to sample at far above the Nyquist rate to increase the time resolution. This, however, greatly increases the A/D converter speed and cabling bandwidth requirements, often with prohibitive cost consequences.

The signal to noise improvement (array gain) possible from a beamformer system is largely a function of the number of sensors in the array. For high performance systems, many sensors are required. Large computational and input-output requirements often preclude the use of microprocessors or digital signal processors (DSP).

This invention presents a versatile beamformer which can function alone or as a slice in a larger custom processor constructed at the board level. The invention uses interpolation beamforming (time domain) and provides system versatility and expandability.

Accordingly, it is an object of this invention to provide a compact, low cost, real-time digital system which can form multiple, steerable beams from wideband ultrasonic signals received by an array of sensors such as hydrophones.

It is a further object to provide such a system which can form such beams from signals received from various sensor array shapes such as circular, linear, planar, cylindrical and the like.

It is a further object to provide such a system which can accept signal sample rates in the range from 1 Hz to 1 MHz.

It is a further object to provide such a system which is compact for enclosure in an undersea pressure vessel, which is remotely controllable from shore, and which is flexible and capable of other DSP functions.

DESCRIPTION OF THE PREFERRED EMBODIMENT

Figure 1:
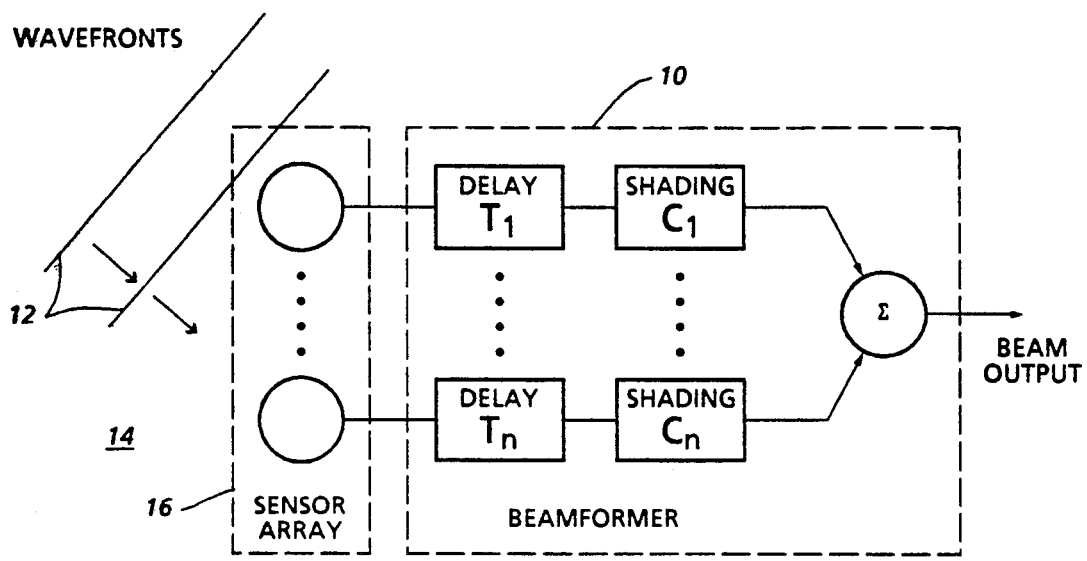
FIG. 1 is a schematic showing of a conventional time domain beamformer.

Referring to FIG. 1, there is shown a conventional time domain beamformer 10. Wavefronts 12 propagating through a medium such as the ocean 14 impinge on an array of sensors 16, such as hydrophones, and generate signals. Conventional time-domain beamforming is accomplished by summing the appropriately delayed and shaded (weighted) signals. The received beam pattern is redirected (steered) and reshaped by electronically adjusting the delays and shading factors.

Figure 2:
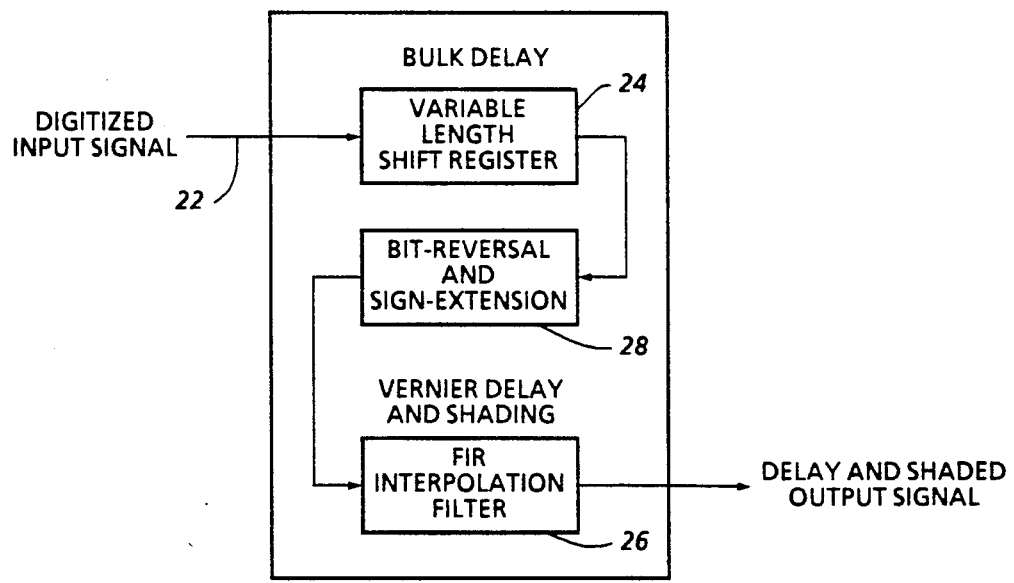
FIG. 2 is a block diagram of a channel subsystem used in the invention.

A beamformer according to the invention is comprised of two major subsystems, a channel and a summation tree. The channel can be thought of as a slice in the beamformer space. A plurality of channels, on several chips if necessary, can operate in parallel to create beamformer processors for virtually any size sensor array, and any number of beams. As shown in FIG. 2, the channel 20 is a pipelined structure which performs the delay, interpolation, and shading required for the input signals 22. One channel is dedicated to each sensor for each beam output. Within the channel 20, the variable length shift register 24 delays the incoming signal 22 to within one sample period of the required delay. The register 24 is described in greater detail in the discussion of FIG. 6. The FIR filter 26 then interpolates for the remaining vernier delay and simultaneously applies the shading. The sign-extension/bit-reversal circuit 28, which is described in greater detail with FIG. 7, is designed to eliminate arithmetic overflow.

Figure 3:
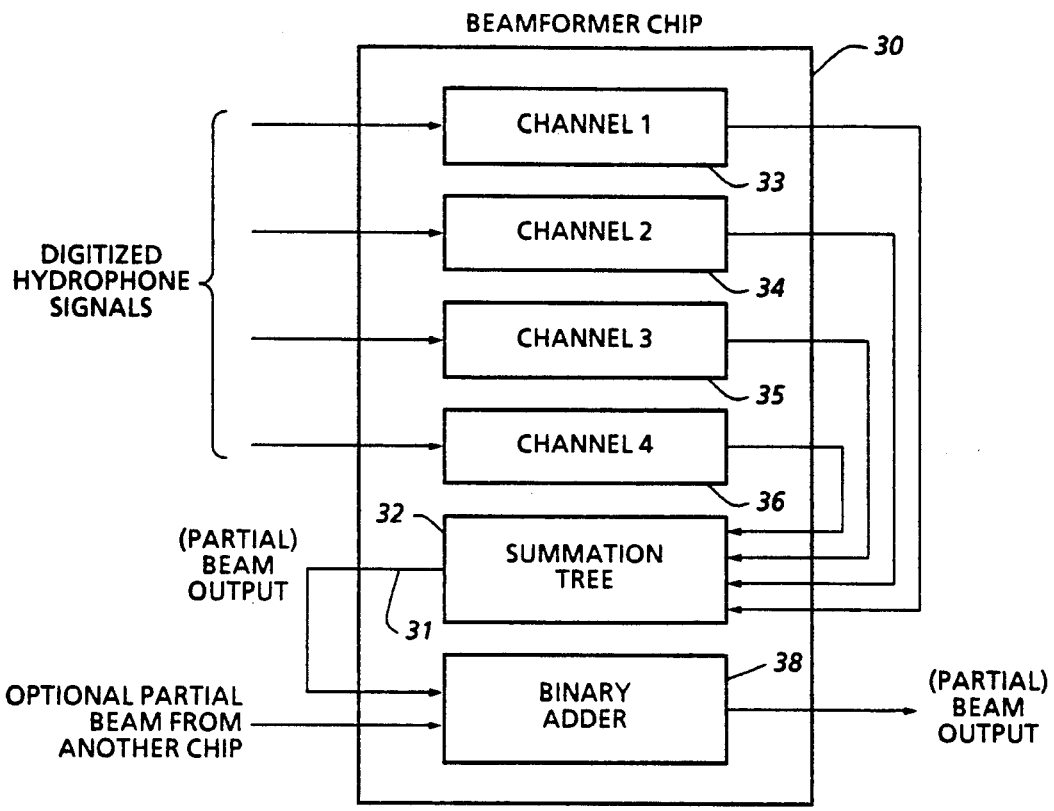
FIG. 3 is a block diagram of a beamformer chip employing the invention.

FIG. 3 shows a four-channel beamformer chip 30 and how it is used in a typical beamformer application. The summation tree 32 employs a plurality of bit-serial adders and combines the channel outputs to form the final (or partial) beam signal 31. An independent binary adder 38 is also included to add this sum to that from another chip if desired. The summation tree has as many inputs as channels 33, 34, 35, and 36, on the chip. All inputs and outputs are connected to pins to increase flexibility.

The beamformer chip 30 employs a bit-serial architecture in which data bits are transmitted sequentially on single wires as opposed to simultaneously on parallel busses. This permits more efficient communication within and between beamformer chips, which is advantageous in view of the large number of inputs required. Bit serial architecture provides a fully parallel architecture with each processor element dedicated to one function in a data path. A bit serial formal using twos-complement arithmetic was adopted for all computational operators (adders, multipliers, etc.) thus providing space efficient structures tightly pipelined at the bit level. Most operators have a control input termed least significant bit sync (LSBS), to synchronize operations with the arrival of new data words. These operators generally have an LSBS output which is the same as the input but delayed by the operator latency, and can be used as the LSBS input to the next operator(s) in the data path.

Figure 4:
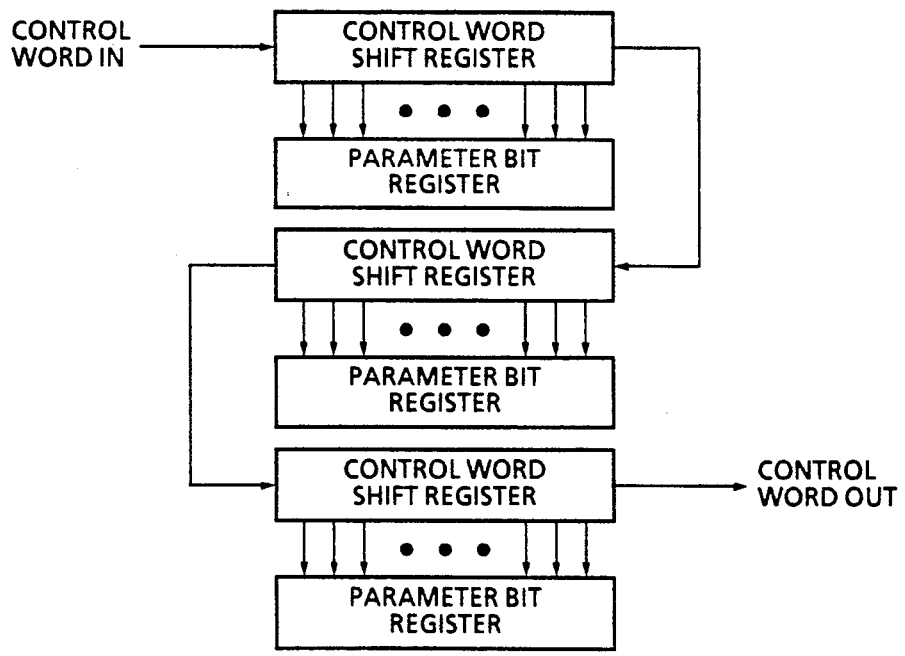
FIG. 4 is a block diagram of a control word shift register and parameter registers employed in the invention.

Most operators have a third type of input, the parameter. Paramenters are stored in static parallel in, parallel out (PIPO) registers throughout the beamformer chip, adjacent to the cells they control. Parameter bits are sometimes used for control (as in multiplexer control) and sometimes for data (as in muliplier coefficients). A distributed serial in, parallel out (SIPO) control word shift register connects all the parameter bit registers on the beamformer chip in a daisy chain fashion as shown in FIG. 4. The serial control word input and output are both connected to pins so that the shift register chain can continue across chip boundaries. When the chip is to be dynamically reconfigured, as for beam steering, the appropriate control word is first shifted into the SIPO control word register. A special input is then toggled which allows the parallel load of all control bits into their corresponding parameter bit registers. This load is synchronized with the next LSBS pulse to minimize data path corruption.

Figure 6:
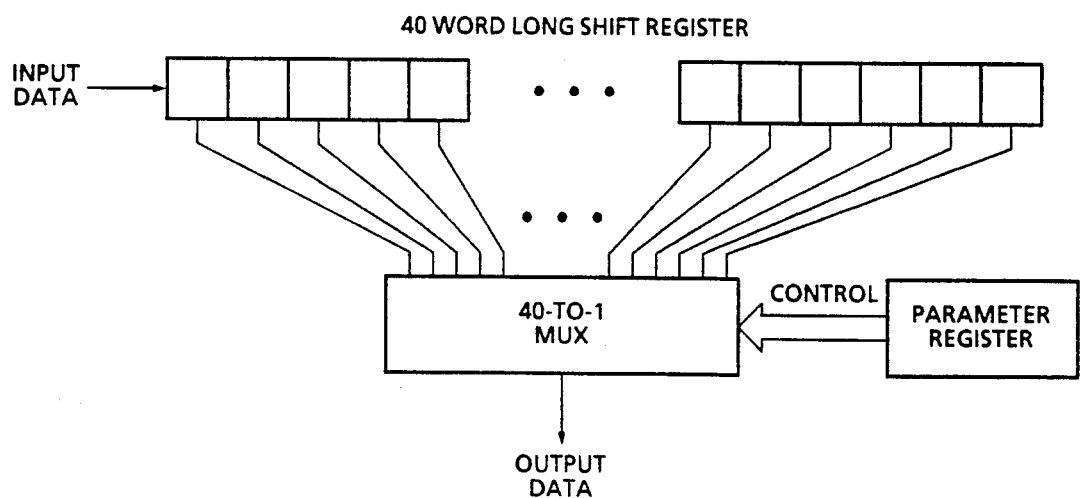
FIG. 6 is a functional block diagram of the variable length shift register employed in the invention.
Figure 7:
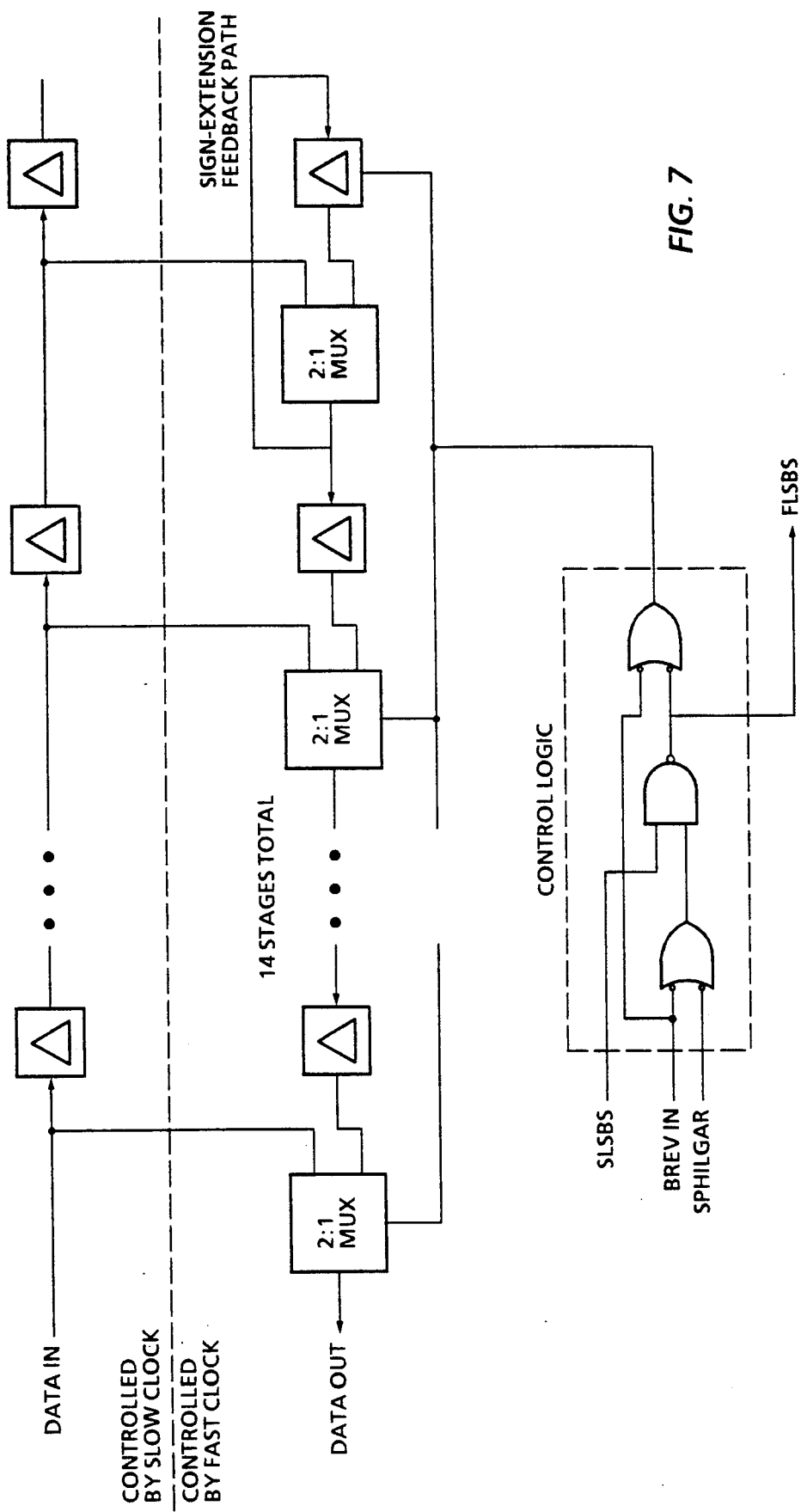
FIG. 7 is a block diagram of a sign-extension/bit-reversal filter employed in the invention.

Referring to FIG. 2 and FIG. 6, the variable length shift register 24 implements bulk delays equal to an integral number of sample periods. At the core is a continuous serial shift register which is 40 sample words long. A 40-to-1 multiplexer is used to extract the data at the desired delay point. A register of parameter bits supplies the control inputs to the multiplexer. This register delays the signal to within one half sample period of the required delay. It should be noted that the data in the shift register is unaffected during reconfiguration (beam steering). Only a single discontinuity is created in the data, thus causing far less data corruption than heretofore.

Within the FIR interpolation filter 26, reconstruction of continuous time signals from sampled signals is done by convolution with a sync function as follows:

$$x(t) = \sum_{n=-\infty}^{\infty} x[n] \frac{\sin[\pi(t - nT)/T]}{\pi(t - nT)/T} \quad \text{Equation (1)}$$

where T is the sample. In the beamformer system, interpolation for small delay values (0<t<T) is accomplished by convolving the input signal with a truncated and windowed sync function as follows:

$$x'(t) = \sum_{n=-3}^{4} x[n] \frac{\sin[\pi(t - nT)/T]}{\pi(t - nT)/T} w_H[n] \quad \text{Equation (2)}$$

where w[n] is a Hamming window. The accuracy of the interpolation is limited primarily by the length of this function (length of the FIR filter) and the normalized signal frequency. Table 1 shows the average interpolation error power, normalized to the signal power, introduced by equation (2) when interpolating a sine wave.

TABLE 1

| Normalized Frequency | Error Power(dB) |
|---|---|
| 0.300 | −47.9 |
| 0.325 | −33.4 |
| 0.350 | −25.3 |
| 0.375 | −19.3 |
| 0.400 | −14.6 |

Shading (weighting) is effected by scaling of the filter coefficients. All coefficients are loaded by way of the control word shift register.

The channel 20 has two different clocks for data path control. The variable length shift register 24 operates under the control of the slower clock which normally toggles at half the rate of the fast clock which controls the FIR filter 26. In this way, the variable length shift register 24 only needs to delay 14 bit data words (halving the required number of memory bits) while the FIR filter can operate on larger 28 bit data words (for improved accuracy and dynamic range).

Referring to FIG. 2 and FIG. 7, the sign-extension/bit reversal filter 28 has several functions. Its primary function is to transfer the data from control of the slow clock to that of the fast clock and in so doing to properly sign extend the data words to maintain signal integrity. To perform this function, a SIPO and a PISO shift register are employed along with control logic to perform a parallel load from one to the other. The SIPO operates under the control of the slow clock and inputs 14 bit data words from the variable length shift register. The PISO operates under control of the fast clock and outputs equivalent, sign extended, 28 bit data words. The sign extension is accomplished by feeding the last bit of the PISO register back to itself as shown. As an example, the twos complement number 1011 has a decimal value of −5. After the sign extension of four bits, the number becomes 11111011 which also has a decimal value of −5. A second function of this circuit is to reverse the bit order from most significant bit first (MSBF) to least significant bit first (LSBF). This is done by reversing the directions of the two shift registers. The purpose of this function is to increase the compatibility with A/D converters and minimize off-chip components. The sign extension/bit reversal filter can be functionally removed from the channel under control of a separate one bit parameter register. Normally this parameter bit, labeled "BRevIn" is asserted; when it is not, it will force the control logic into a continual load state which causes the data to effectively bypass the filter. This provides the capability to accept 28 bit data words. Under these conditions, the externally supplied slow and fast clocks are made identical. With 28 bit words occupying the variable length shift register, only 20 of the 40 taps are used and the maximum delay is reduced to 20 sample periods. Another function of the sign extension/bit reversal filter is to generate the proper LSBS signal to accompany the output data. As shown, this signal, labeled FLSBS, is generated from the input LSBS signal (SLSBS) and one of the slow clock signals (SPhilbar). Under normal operation (BRevin asserted) the FLSBS will be half the width of the SLSBS. With BRevIn not asserted, SLSBS and FLSBS become equal.

An additional 4-bit parameter register is used for controlling off-chip devices such as electronic switches.

This register operates like other parameter registers but drives four output pins.

The beamformer architecture was designed to achieve versatility. Several more primitive DSP functions (delay, summation, multiplication and filtering) are included. These primitive functions can be arranged differently to increase beamformer performance or to perform other useful functions such as inverse beamforming, FIR filtering or IIR filtering.

Figure 5:
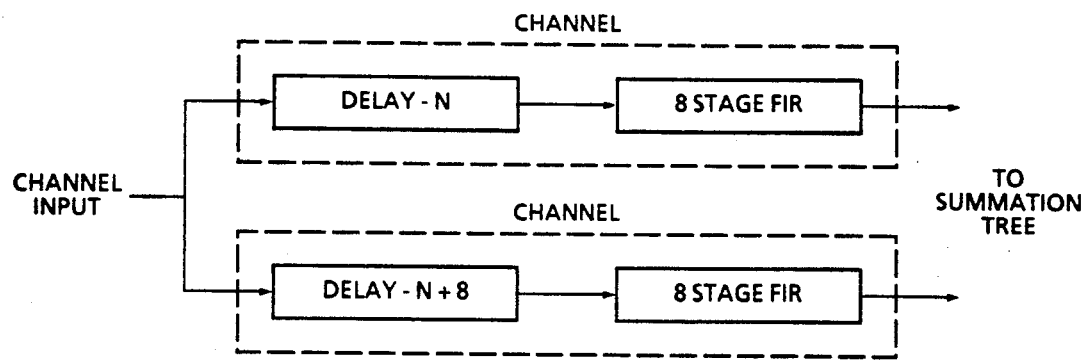
FIG. 5 is a block diagram of a channel configuration for a 16 stage FIR.

To increase the interpolation accuracy, two channels can be connected in parallel, effectively creating a 16 stage FIR filter as shown in FIG. 5. Using the variable length shift register, the data into the second channel would be skewed by eight sample periods to account for the eight FIR stages in the first channel.

This same concept can be applied to produce very large FIR structures for filtering applications. A plurality of channels can be combined in parallel. The 40 word delay limitation of the variable length shift register is overcome by connecting shift registers in series. A special shift register output pin is provided for this purpose. IIR filtering can be performed using two FIR filters, one in the feed forward path and one in the feedback path. The sign extension/bit reversal filters can be optionally bypassed. This is done for the FIR filter in the feedback path for input compatibility.

To perform inverse beamforming (sometimes termed phased array transmitting), a common signal is applied to multiple channels. Each channel creates appropriately delayed signals for the elements a transducer array. The output beam signal can be dynamically steered and focused by adjusting the delay and shading of the channels.

What is claimed is:

1. A circuit for enhancing the amplitude of a signal received by the circuit relative to ambient noise and directional interference comprising;
   first means for providing a predetermined bulk delay to the signal received by the circuit,
   second means including a sign extension/bit reversal filter for filtering signal data words received from the first means and,
   third means for providing a predetermined vernier delay to the signal received from the second means, whereby a signal indicating the amplitude of the signal received by the is generated.

2. A circuit as set forth in claim 1 wherein the first means includes a variable length shift register.

3. A circuit as set forth in claim 1 and further including a summation tree which acts to sum the received signals.

4. A circuit as set forth in claim 1 wherein the third means includes a FIR interpolation filter.

5. A circuit for enhancing the amplitude of a signal received by the circuit relative to ambient noise and directional interference comprising; first means for providing a predetermined bulk delay to the signal received by the circuit, second means for filtering signal data words received from the first means and, third means including a FIR interpolation filter for providing a predetermined vernier delay to the signal received from the second means, whereby a signal indicating the amplitude of the signal received by the circuit is generated.

6. A circuit as set forth in claim 5 wherein the second means includes a sign extension/bit reversal filter.

7. A circuit as set forth in claim 5 wherein the first means includes a variable length shift register.

8. A circuit as set forth in claim 5 and further including a summation tree which acts to sum the received signals.

* * * * *